United States Patent
Irie et al.

(10) Patent No.: US 6,221,228 B1
(45) Date of Patent: Apr. 24, 2001

(54) PART FABRICATING METHOD AND PART FABRICATING APPARATUS

(75) Inventors: Reiko Irie; Masayuki Suda; Toshihiko Sakuhara; Tatsuaki Ataka, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/204,636

(22) Filed: Dec. 2, 1998

(30) Foreign Application Priority Data

Dec. 3, 1997 (JP) .................................................. 9-332902

(51) Int. Cl.⁷ ............................... C25D 1/10; C25D 5/10
(52) U.S. Cl. .............................................. 205/70; 205/170
(58) Field of Search ............................ 205/70, 170, 182, 205/223

(56) References Cited

U.S. PATENT DOCUMENTS

| | | | |
|---|---|---|---|
| 3,723,695 | * 3/1973 | Gutnajer | 219/69 E |
| 4,947,016 | * 8/1990 | Puyplat | 219/69.17 |
| 5,162,078 | * 11/1992 | Bley et al. | 205/75 |
| 5,441,626 | * 8/1995 | Ogisu et al. | 205/50 |
| 5,641,391 | * 6/1997 | Hunter et al. | 205/80 |
| 5,976,340 | * 11/1999 | Sheldon et al. | 205/70 |

FOREIGN PATENT DOCUMENTS

| | | |
|---|---|---|
| 52-013436 | 2/1977 | (JP) . |
| 1033556 | 7/1989 | (JP) . |
| 2073987 | 3/1990 | (JP) . |
| 2260492 | 10/1990 | (JP) . |
| 5271969 | 10/1993 | (JP) . |
| 5279873 | 10/1993 | (JP) . |
| 6032078 | 2/1994 | (JP) . |
| 8050350 | 2/1996 | (JP) . |
| 8227007 | 9/1996 | (JP) . |
| 9295078 | 11/1997 | (JP) . |

* cited by examiner

Primary Examiner—Kathryn Gorgos
Assistant Examiner—Erica Smith-Hicks
(74) Attorney, Agent, or Firm—Adams & Wilks

(57) ABSTRACT

A part fabricating method comprises the steps of machining an object to fabricate a part cast mold, depositing a first metal on a surface of the cast mold to form a first metal layer, and depositing a second metal different in kind from the first metal inside the cast mold to form a part. The first metal layer is then selectively removed to take out the part formed inside the cast mold.

18 Claims, 9 Drawing Sheets

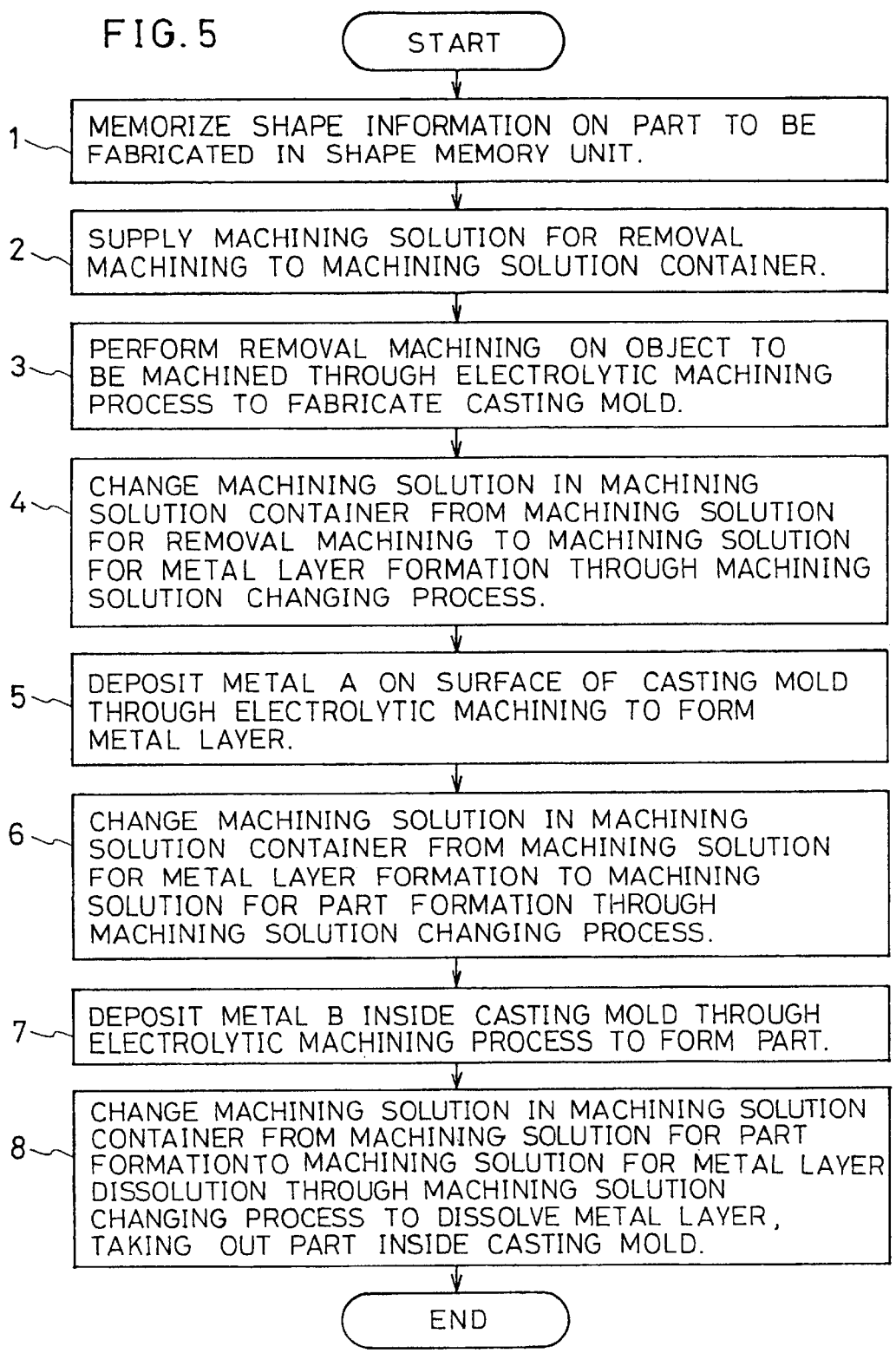

PART FABRICATING METHOD AND PART FABRICATING APPARATUS

BACKGROUND OF THE INVENTION

The present invention relates to a part fabricating method and part fabricating apparatus for fabricating parts in the fields of metal industry, electronic industry, machinery industry and so on.

In the conventional part fabricating methods, there has been a method utilizing a machining technology or electric discharge technology to remove unwanted portions of objects to be machined into a desired shape to thereby fabricate parts. In the method utilizing a machining technology, parts have been fabricated using a cutting tool wherein any of the cutting tool and object to be machined is rotated to bring the cutting tool and the object to be machined into contact at the same time, thereby removing unwanted portions of the object to be machined into a desired shape. In the method utilizing an electric discharge technology, parts have been fabricated by making a machining electrode having a corresponding tip shape to a desired machining form wherein the machining electrode and the object to be machined are adjusted to a predetermined distance to repeatedly cause pulse-formed electric discharge between the machining electrode and the object to be machined, thus removing unnecessary portions of the object to be machined.

However, there have been some problems in the conventional part fabrication methods. First, the following points can be listed as the problems encountered in the machining technology.

(1) Because only removal machining is possible, there may be a case that the efficiency of material utilization is extremely worsened as the part fabricating shape may be, or a long machining time is required even for a simple shape.

(2) Because machinable shapes are limited to the type machining machine used the fabrication of parts having complicated shapes requires many kinds of machining machines with increased process steps.

(3) Because operation is by contacting a cutting tool with an object to be machined, the consumption in the cutting tool is unavoidable. Because the consumption of the cutting tool raises a problem of lowering in machining accuracy or roughening in machining surface, the cutting tool must be exchanged as required and full automation for part fabrication is difficult.

(4) Because removal machining is effected by utilizing a physical force caused between a cutting tool and an object to be machined, there is affection due to the hardness or toughness of the object to be machined. Accordingly, there is a necessity of adjusting the type of cutting tool used and machining conditions in compliance with the material of the object to be machined.

(5) The machining resolution increases with decrease in tip diameter of a cutting tool, whereas there is limitation in cutting tool sharp-edging due to machining utilizing a physical force. Accordingly, there is difficulty in coping with miniaturization for fabrication parts.

Next, the following points can be listed as problems encountered in the method utilizing the electric discharge technology.

(1) Because the forming shape of an object to be machined is determined by a tip shape of the machining electrode, before performing machining the machined electrode must have been previously made to have a tip shape corresponding to a desired forming shape.

(2) Because only removal of material from the object is possible similarly to the foregoing convention machining process, the efficiency of material utilization is decreased and a long machining time is required even for a simple shape.

(3) The consumption in the machining electrode is unavoidable similarly to machining, and the machining electrode has to be exchanged as required. In the electric discharge machining method, each exchange of the machining electrode, requires a machining electrode having a tip shape corresponding to a forming shape, thus worsening machining efficiency.

(4) Removal chips produced in machining adhere to a surface to be machined, having bad effects upon machining accuracy.

(5) In order to cause pulse-formed electric discharge required upon removal machining, a great voltage has to be applied, thus increasing energy consumption during machining.

(6) Because a machining electrode having a tip form corresponding to a desired part shape is utilized to effect removal from a surface to be machined, the direction of machining progression is only in a depth direction of the object to be machined and there is difficulty in fabricating parts having a complicated three-dimensional shape.

The present invention provides a means to solve the above-stated problems.

SUMMARY OF THE INVENTION

In order to solve the above-stated problems, the present invention is characterized by fabricating a part by: first performing removal machining on an object to be machined to fabricate a part cast mold, then depositing a metal A on a surface of the cast mold to form a metal A layer, depositing, a metal B different in kind from the metal inside the cast mold to form a part, and finally selectively removing the metal A to take out the part.

Also, in a process of the cast mold fabrication, metal layer formation or part formation, the removal machining or metal deposition is effected by an electrolytic machining method wherein the object to be machined and a machining electrode are opposite placed in an electrolytic solution to cause electrochemical reaction for machining between a surface to be machined of the object to be machined and a tip of the machining electrode. Here, a sharp-edged electrode may be used as the machining electrode.

Also, in a process of the cast mold fabrication, metal layer formation or part formation, machining is made while moving the machining electrode or object to be machined along an arbitrary shape.

Also, a part fabricating apparatus is characterized by comprising: an object to be machined holding means for holding an object to be machined in an electrolytic solution, a machining electrode for subjecting machining in a surface to be machined of the object to be machined through electrochemical reaction, a spacing changing means for detecting and changing a spacing between, the surface to be machined of the object to be machined held by the object to be machined holding means and the machining electrode, a potential/current control unit for controlling a potential/current on the machining electrode, an electrolytic solution changing means for arbitrary changing an electrolytic solution A for effecting removal machining on the surface to be machined to fabricate a cast mold, an electrolytic solution B for depositing a metal A on a surface of the cast mold to form the metal layer A, and an electrolytic solution C for depositing the metal B inside the cast mold to form a part.

The part fabricating apparatus is provided with the machining electrode, for example, sharp-edged, in order to increase machining accuracy.

Also, the part fabricating apparatus is provided, as a means to move the machining electrode and the object to be machined along an arbitrary shape in a process of the cast mold fabrication, metal layer formation or part formation, with a shape information memory means for memorizing arbitrary shape information and a moving position control means for moving the machining electrode or object to be machined along an arbitrary shape based on shape information memorized in the shape information memory means.

Also, the part fabricating apparatus is provided, as a means to use a plurality of machining electrodes, with a machining electrode holding means for holding the plurality of machining electrodes, and a machining electrode changing means for arbitrarily changing between the plurality of machining electrodes held by the machining electrode holding means.

BRIEF DESCRIPTION OF THE DRAWINGS

FIG. 5 is a flowchart showing a part fabricating method according to the present invention;

DETAILED DESCRIPTION OF THE PREFERRED EMBODIMENTS

Embodiment 1

Figure 1:
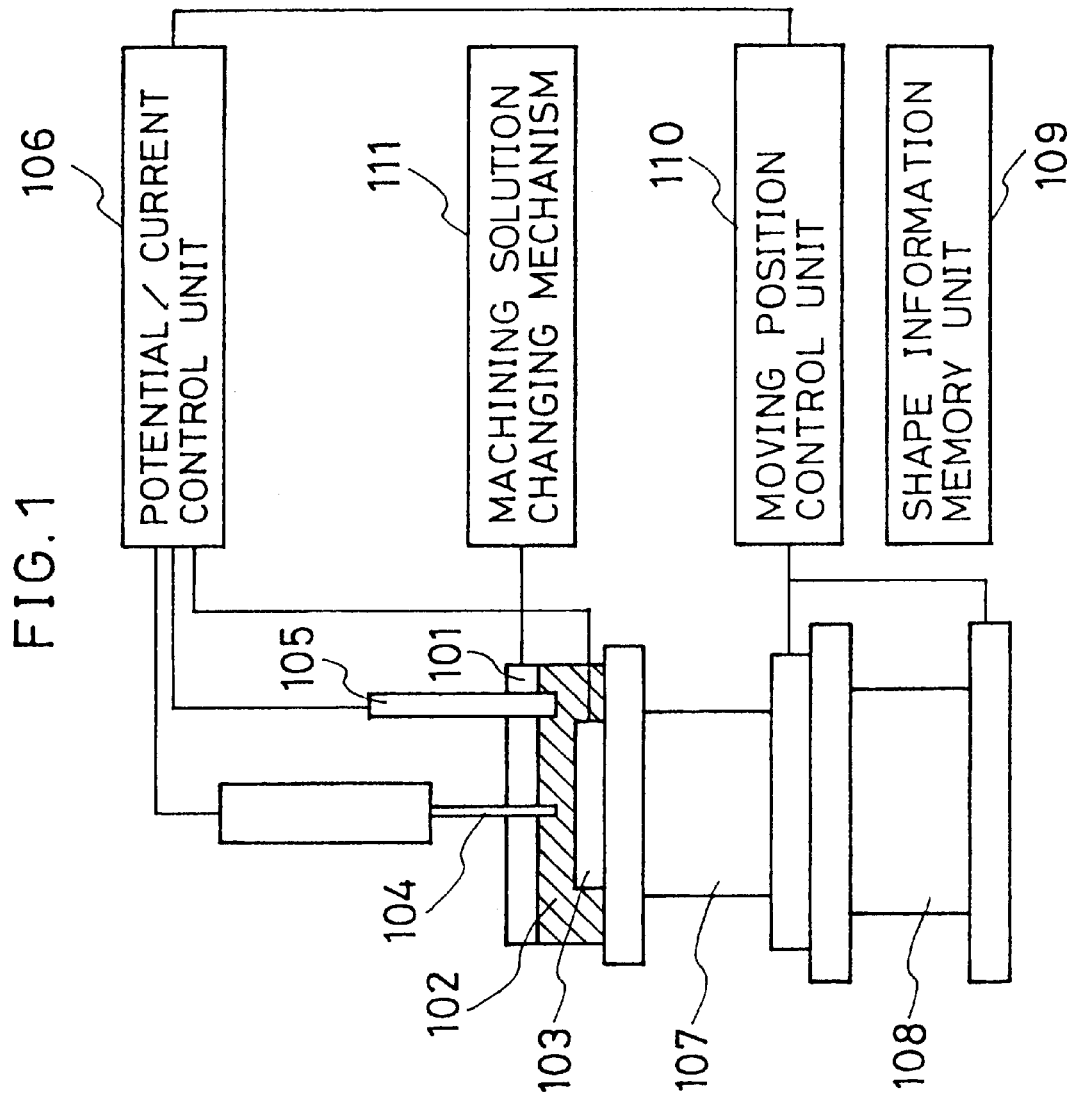
FIG. 1 is a typical diagram showing a first embodiment of a part fabricating apparatus of the present invention.

FIG. 1 shows Embodiment 1 where the present invention is utilized to fabricate a part. The present embodiment is structured by an object to be machined 103 immersed in a machining solution 102 within a machining solution container 101, a machining electrode 104 arranged opposite to the object to be machined 103 to electrolytically machine the object to be machined 103, a reference electrode 105 as a reference in electrode potential, a potential/current control unit 106 for controlling the potential and current on the machining electrode 104, an XY-axis stage 107 for moving the object to be machined 103 in X-axis and Y-axis directions (horizontal directions), a z-axis stage installed beneath the machining solution container 101 to move the object to be machined 103 in a Z-axis direction (vertical direction), a shape information memory unit 109 for memorizing an arbitrary shape information, a moving position control unit 110 for controlling the movement of the XY stage 107 and the Z stage 108 based on shape information memorized by the shape information memory unit 109, and a machining solution changing mechanism 111 connected to the machining solution container 101 to feed a machining solution 102 to and from an inside and outside the machining solution container 101.

The potential/current control unit 106 is provided, for example, with a machining electrode circuit 106A called potentio galvanostat, a micro-computer for controlling the potential on the machining electrode 104 of the machining electrode circuit 106A and the current etc. flowing between the machining electrode 104 and the object to be machined 103, and various operating keys for operation.

Figure 2:
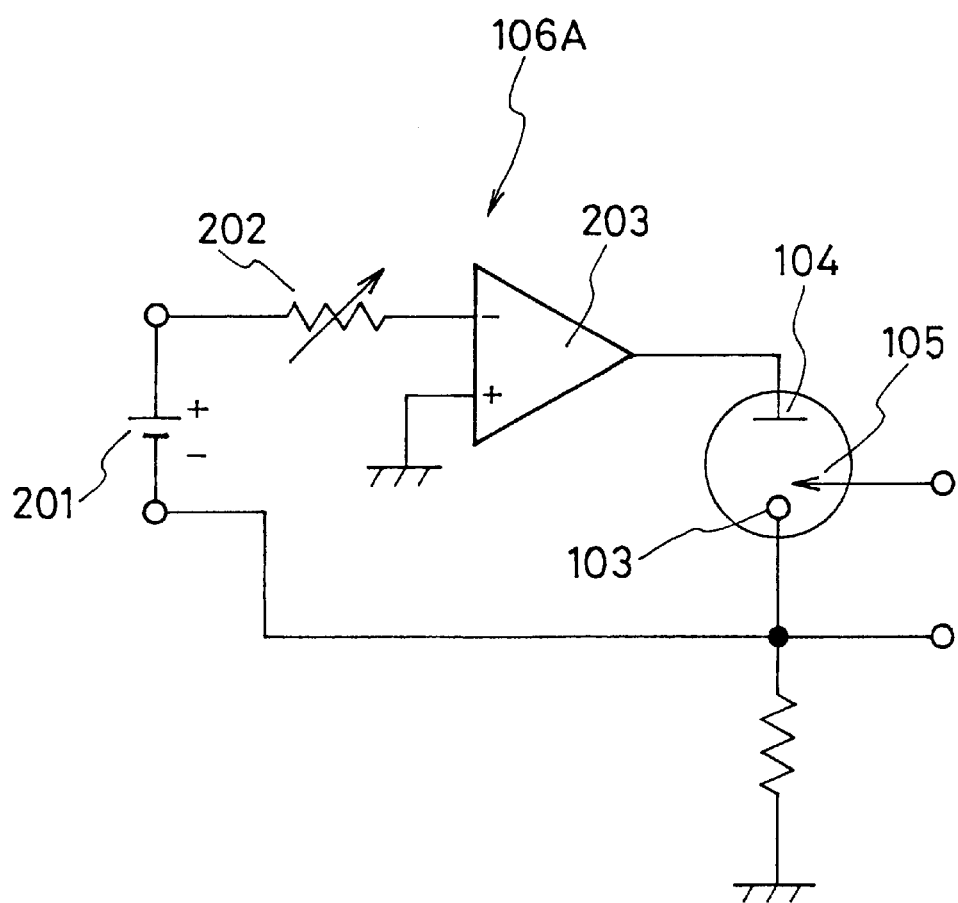
FIG. 2 is a circuit diagram showing an example of a constant current circuit used in the present invention.

The machining electrode circuit 106A is structured, for example as shown in FIG. 2, by a variable resistance 202 connected to a plus side of a constant voltage power supply 201, an operational amplifier 203 connected to the variable resistance 202, an opposite electrode (machining electrode) 104 connected to an output section of the operational amplifier 203, an acting pole (object to be machined) 103 oppositely arranged to the opposite electrode (machining electrode) 104 and connected to a minus side of the constant voltage power supply 201, and a reference electrode 105 as a reference to measure the potential on the acting pole (object to be machined) 103.

The machining electrode 104 is a rod form member sharp-edged at its tip opposite to a surface to be machined and exposed at only one portion of a tip end with other portions coated by an insulator. Also, the material of the rod member uses, for example, carbon, tungsten, platinum or the like.

Also, the reference electrode 105 is, for example, a glass cylindrical member having a solution passage provided at a tip on a side to be immersed in a machining solution and a silver thin wire provided in a center of the cylindrical member to reach a glass film, wherein a silver chloride: solution is filled in a manner immersing the thin wire. The reference electrode 105 does not require to control the potential on the machining electrode 104 and the object to be machined 103, which is not necessarily required where only performing current control between the machining electrode 104 and the object to be machined 103.

According to this machining electrode circuit 106A, it is possible to control the current flowing between the opposite electrode (machining electrode) 104 and the acting pole (object to be machined) 103 to a current required for electrolytic machining by varying the resistance value of the variable resistance 202.

The XY-axis stage 107 and the Z-axis stage 108 are moved in the XY-axis directions and the Z-axis direction by an electrical drive means under the control of the moving position control unit 110.

In electrical machining, the Z-axis stage 108 is first moved in the Z-axis direction by a distance control means to control the space distance between the machining electrode 104 and the object to be machined 103 to a predetermined spacing, and then a predetermined voltage is applied to between the machining electrode 104 and the object to be machined 103 to cause a constant current to flow between the machining electrode 104 and the object to be machined 103. At the same time, the XY stage 107 and the Z-stage 108 are driven by the moving position control unit 110 based on shape information memorized by the shape information memory unit 109, in order to move the machining electrode along a shape of a part to be fabricated above the object to be machined. The above process is hereinafter referred to as an electrolytic machining process.

The distance control means for example first controls, through the current/potential control unit 106, the current flowing between the object to be machined 103 and the machining electrode 104 to nearly zero, and then slowly moves the Z-axis stage upward to cause the object to be machined 103 to approach the machining electrode 104 while measuring the potential on the object to be measured. Because if the object to be machined 103 is brought into contact with the machining electrode 104 due to this ascending motion the potential of the object to be machined 103 greatly varies, the position on the Z-axis at this time is determined as zero spacing position. Taking this position as a reference, the Z-axis stage 108 is driven under the control of the moving position control unit 110 to control the space distance between the machining electrode 104 and the object to be machined 103 to a desired spacing. Besides this method, a method can be considered that the apace distance is measured by a laser length measuring device.

Figure 3:
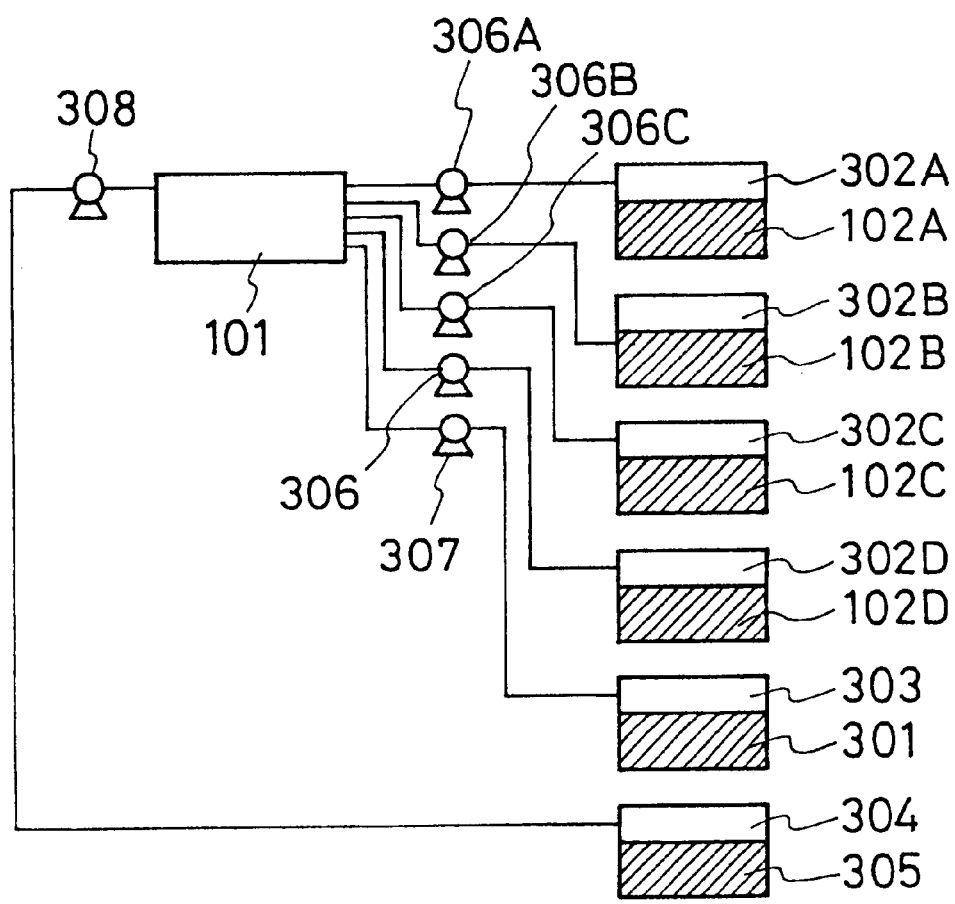
FIG. 3 is a typical diagram showing an example of a machining solution changing mechanism according to FIG. 1.

The machining solution changing mechanism 111 is structured, for example as shown in FIG. 3, by a machining solution tank (A) 302A containing a machining solution (A) 102A used when fabricating a cast mold by subjecting the object to be machined 103 to removal process, a machining tank (B) 302B containing a machining solution (B) 102B used upon forming a metal layer, a machining solution tank (C) 302C containing a machining solution (C) 102C used upon forming a part, a machining solution tank (D) 302C containing a machining solution (D) 102D used upon dissolving a metal, a cleaning solution tank 303 containing a cleaning solution 301 used for cleaning the machining solution container 101 during changing the machining solution, a solution feed pump (A) 306A connected to the machining solution tank (A) 302A to food the machining solution (A) 102A within the machining solution tank (A) 302A to the machining solution container 101, a solution feed pump (B) 306B connected to the machining solution tank (B) 302B to feed the machining solution (B) 102B within the machining solution tank (B) 302B to the machining solution container 101, a solution feed pump (C) 306C connected to the machining solution tank (C) 302C to feed the machining solution (C) 102C within the machining solution tank (C) 302C to the machining solution container 101, a solution feed pump (D) 306D connected to the machining solution tank (D) 302D to feed the solution within the machining solution tank (D) 302D to the machining solution container 101, a solution feed pump (E) 307 connected to the cleaning solution tank 303 to feed the solution 301 within the cleaning solution tank 303 to the machining solution container 101, a waste solution tank 304 for reserving a waste solution 305 discharged from the machining solution container 101, and a solution feed pump (F) 308 for feeding a solution to the waste solution tank 304 upon discharging the solution.

The machining solution changing mechanism 111 can supply a required amount of a solution from the tank containing a machining solution or cleaning solution required for machining to the machining solution container 101, and discharge the machining solution from the machining solution container 101.

Figure 4:
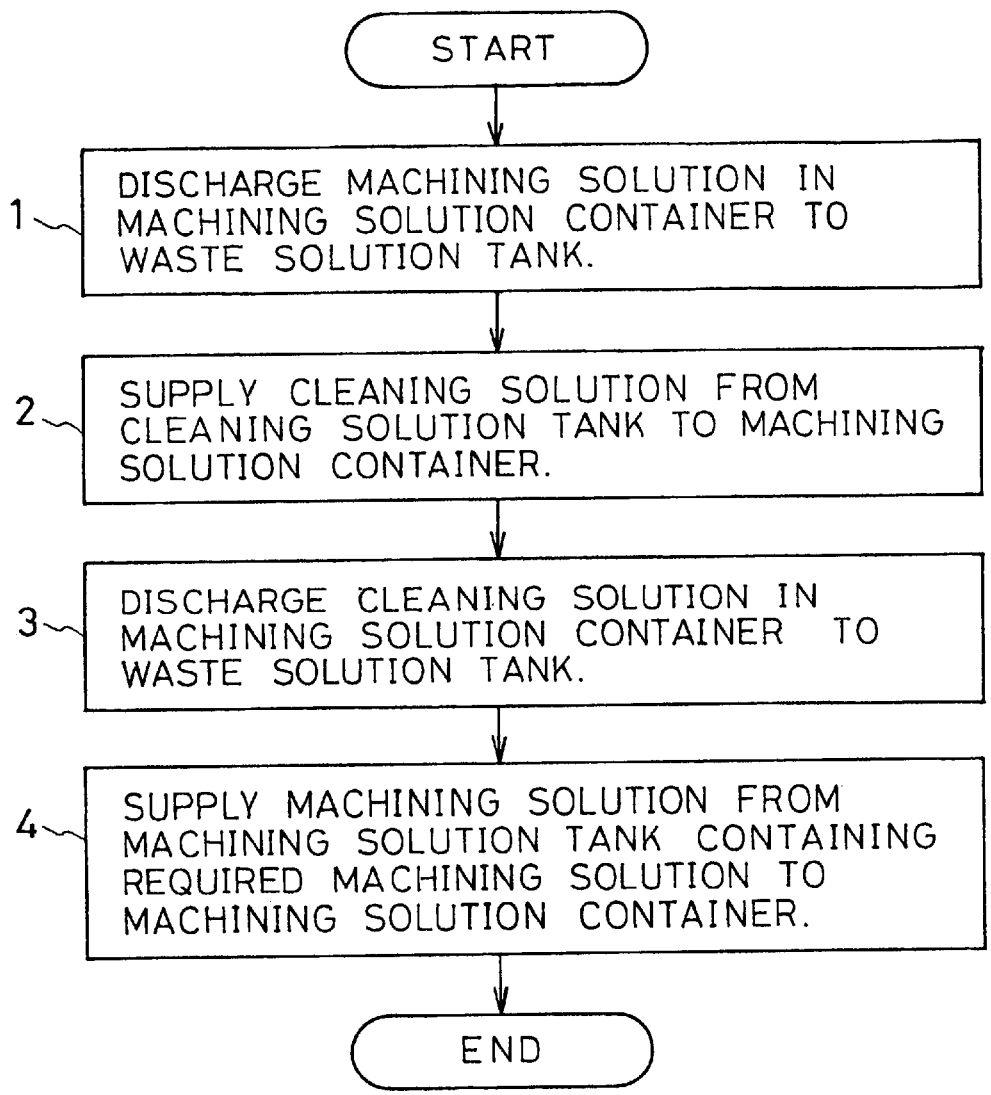
FIG. 4 is a flowchart showing a procedure changing machining solutions.
Figure 6A:
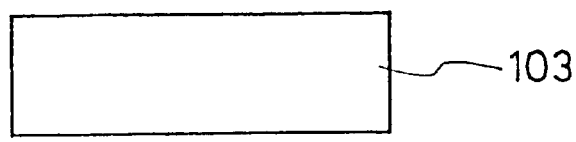
FIGS. 6A, 6B, 6C, 6D, and 6E are process sectional view showing a process for part fabrication according to the present invention.
Figure 6B:
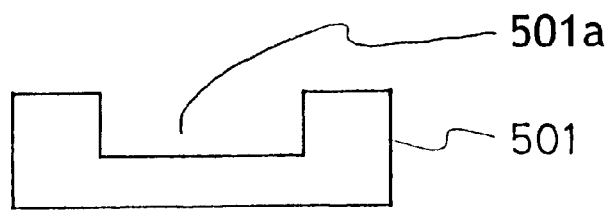
Figure 6C:
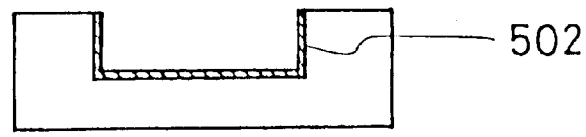
Figure 6D:
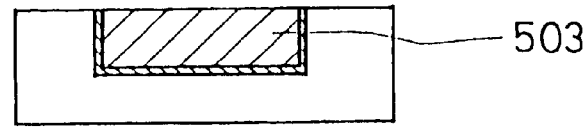
Figure 6E:
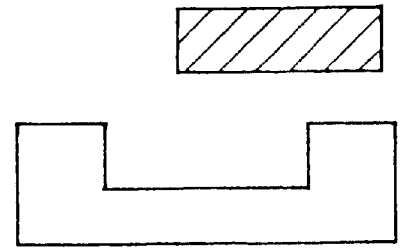

During changing the machining solution, the solution feed pump (F) 308 is first driven to discharge the machining solution in the machining solution container 101 to the waste solution tank 304, as shown in FIG. 4. Then the solution feed pump (E) is driven to supply the cleaning solution 301 in the cleaning solution tank 303 to the machining solution container 101, and the solution feed pump (F) 308 is again driven to discharge the cleaning solution 31 in the machining solution container 101 into the waste solution tank 304. Then a solution feed pump, which is connected to a machining solution tank containing a required machining solution among the machining solution (A) 102A, machining solution (B) 102B, machining solution (C) 102C and machining solution (D) 102D, is driven to supply the machining solution to the machining solution container 101. This process is hereinafter referred to as a machining solution changing process.

The procedure of a part fabricating method according to the present embodiment will be explained hereinbelow based on FIG. 5 and FIG. 6. First the shape information on a part to be fabricated is memorized in the shape information memory unit 109. Then the machining solution (A) 102A as a machining solution for removal process is supplied into the machining solution container 101 by the machining solution changing mechanism 111. Then an object to be machined 103 shown in FIG. 6(*a*) is subjected to removal process, thus fabricating a cast mold 501 for parts as shown in FIG. 6(*b*) and having a cavity 501 (*a*).

Then the machining solution in the machining solution container 101 is changed, through the afore-said machining solution changing process, from the machining solution (A) 102A as a machining solution for removal process to a machining solution (B) 102B as a machining solution for forming a metal layer. Then additional machining is performed through the afore-said electrolyte machining to deposit a metal A on a surface of the cast mold 501 as shown in FIG. 6(*c*), thus forming a metal layer 502.

Then the machining solution in the machining solution container 101 is changed, through the afore-said machining solution changing process, from the machining solution (B) 102B as a machining solution for metal layer formation to a machining solution (C) 102C as a machining solution for electroforming. Then additional machining is performed, through the electrolyte machining, on an inside of the cast mold 501 to deposit a metal B as shown in FIG. 6(*d*), thus forming a part 503.

Finally the machining solution in the machining solution container 101 is changed, through the machining solution changing process, from the machining solution (C) 102C as a machining solution for electroforming to a machining solution (C) 102D as a machining solution for metal layer dissolution to dissolve a metal layer 502 as shown in, FIG. 6(*e*), removing the part 503 formed in side the cast mold 501.

Here, as a method to dissolve the, metal layer 502 is considered a met hod of using a solution for selectively dissolving only the metal A, a method of applying a voltage to selectively dissolve only the metal A, or the like.

In the present embodiment, because the distance between the tip of the machining electrode and a surface to be machined of an object to be machined is controlled to a predetermined spacing with utilizing a sharp-edged machining electrode, and thereafter machining is made such that the machining electrode is moved along a shape of a part to be fabricated above a surface to be machined of the object to be machined, it is possible to simply fabricate a part in a complicated three dimensional form without the necessity of fabricating a machining electrode corresponding to a machining form. Also, because the machining is made in a state of out of contact between the machining electrode and the object to be machined, there is less wear of machining electrode. Also, because the machining is made by the electroforming method utilizing electrochemical reaction, it is possible to perform machining with extremely low energy as compared with the electric discharge machining without affection by the hardness and toughness of the object to be machined. Further, since the part fabricating apparatus in the present embodiment is provided with the machining solution changing mechanism, automation of part fabrication is readily realized.

In an experimental example of fabricating a gear having a diameter of 800 μm by applying the present embodiment thereto, the machining electrode used a platinum-iridium alloy wire sharp-edged at its tip to a tip diameter of 1 μm and coated by resin at other than the tip wherein a chromium substrate was used as an object to be machined. Also, a chromium electrolytic etch solution mixed with 62.7 g/l of a sulfamic acid and 37.3 g/l of a boric acid was used as a machining solution for removal process, a gold plating solution mixed with 7.4 g/l of potassium dicyanoaurarate (I) and 70 g/l of tri-sodium citrate as a machining solution for metal layer formation, a nickel plating solution mixed with 350 g/l of nickel sulfamate and 30 g/l of a boric acid as a machining solution for part formation, and a gold etch solution mixed with 25 g/l of iodine and 100 g/l of potassium iodide as a machining solution for metal layer dissolution.

The procedure for fabricating a gear was performed along with a procedure shown in FIG. 5, wherein gear shape information was first memorized in a shape information-memory unit 109, the chromium substrate was then subjected to removal process to fabricate a gear cast mold, gold was then deposited on a surface of the cast mold, nickel was then deposited inside the cast mold to form a part, and finally the gold layer was dissolved to take the part out.

In the chrome substrate removal process in cast mold fabrication, the distance between the tip of the machining electrode and the surface of the chromium substrate was controlled to 10 μm, and a current pulse of Ion=1000 μA, Ton=0.3 second and Toff=0.3 second was applied by the potential/current control unit while controlling the XY table to be moved along the gear shape information. Then this was repeated 20 times, with the result that a gear cast mold with a depth of 100 μm was fabricated.

In the gold deposition in metal layer formation, the distance between the tip of the machining electrode and the surface of the cast mold was controlled to 10 μm, and a current pulse of Ion=−400 μA, Ton=0.3 second and Toff=0.3 second was applied by the potential/current control unit while controlling the XY table to be moved along the gear shape information. As a result, a gold layer with a thickness of 2 μm was formed on the surface of the cast mold.

In the nickel deposition in metal layer formation, the distance between the tip of the machining electrode and the surface of the cast mold was controlled to 10 μm, and a current pulse of Ion=−1000 μA, Ton=−0.3 second and Toff=−0.3 second was applied by the potential/current control unit while controlling the XY table to be moved along the gear shape information. Further the Z-axis stage was driven by the moving distance control unit so that the distance between the tip of the machining electrode and the machining surface becomes 10 μm. This was repeated 16 times with the result that a nickel gear part with a thickens of 80 μm was formed on the surface of the cast mold.

The gold layer was dissolved by a gold etch solution with the result that a gear having a diameter of 800 μm and a thickness of 80 μm could be taken out.

Embodiment 2

Figure 7:
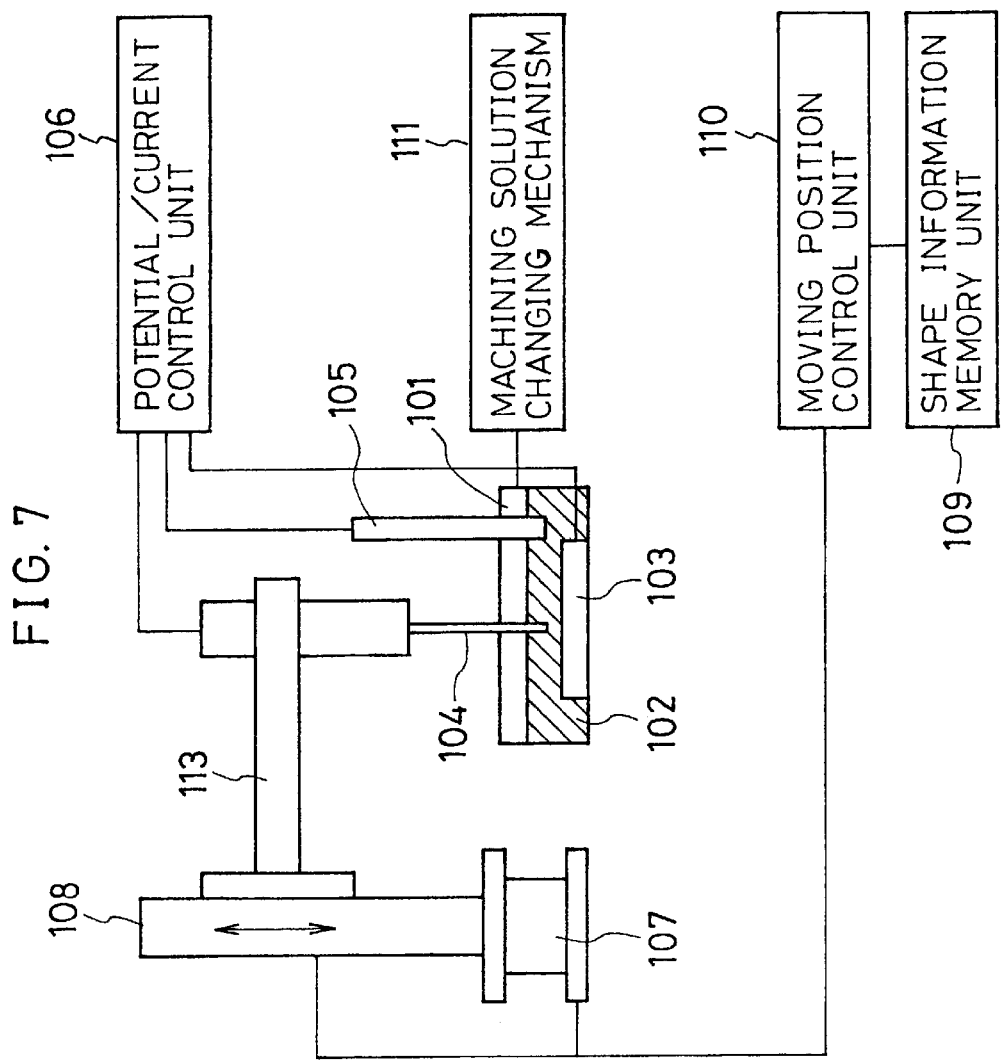
FIG. 7 is a typical diagram showing a second embodiment of a part fabricating apparatus of the present invention.

Although the present embodiment has a structure almost similar to Embodiment 1 as shown in FIG. 7, it is characterized in that the Z-axis stage 108 is arranged on the XY stage 107 and further the wok electrode 104 is attached to the Z-axis stage 108 through a machining electrode attaching arm 113.

In operation of this apparatus, the XY stage 107 moves in the XY directions and the Z-axis stage 108 in the Z-axis direction, causing the machining electrode 104 to follow the attaching arm 113 and hence move in the XY-axis directions and Z-axis direction. This also provides a similar effects to Embodiment 1.

Embodiment 3

Figure 8:
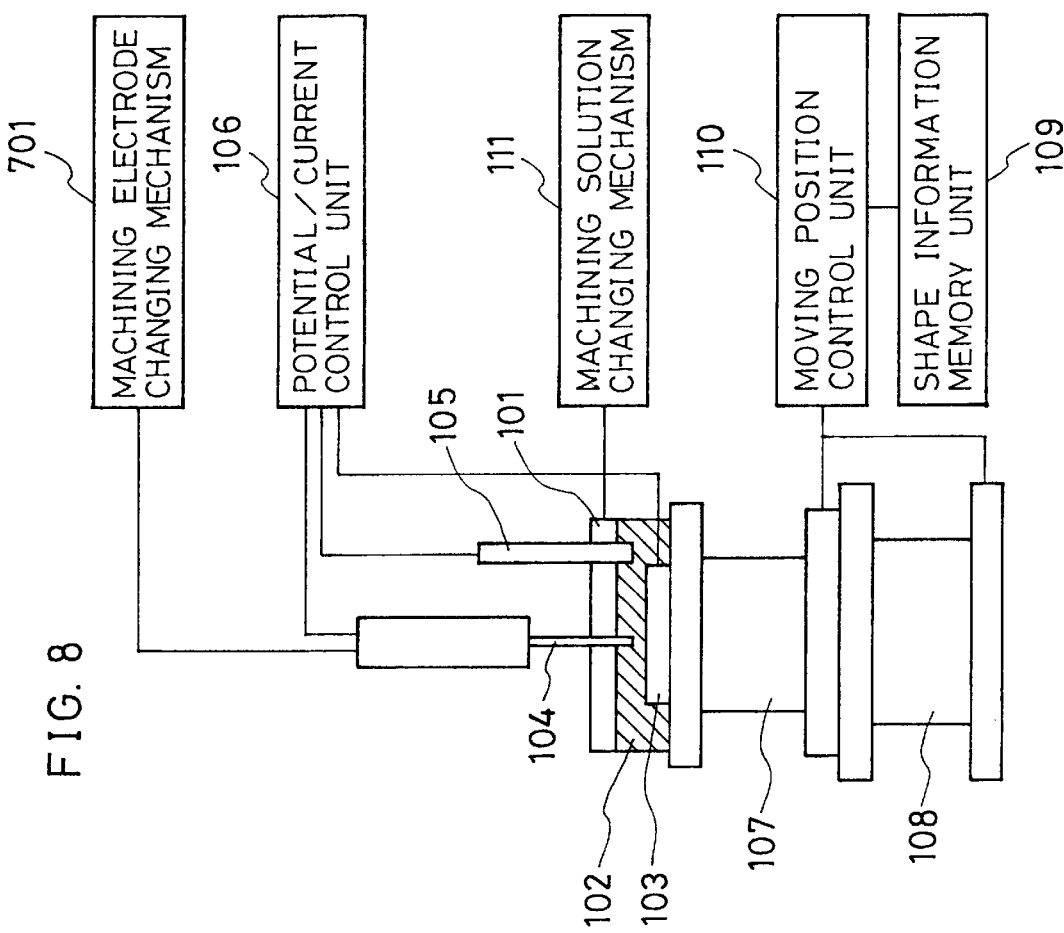
FIG. 8 is a typical diagram showing a third embodiment of a part fabricating apparatus of the present invention.

Although the embodiment is structured almost similar to Embodiment 1 as shown in FIG. 8, it is characterized in that a machining electrode changing mechanism 701 is arranged therein which can exchange the machining electrode for use in machining.

Figure 9:
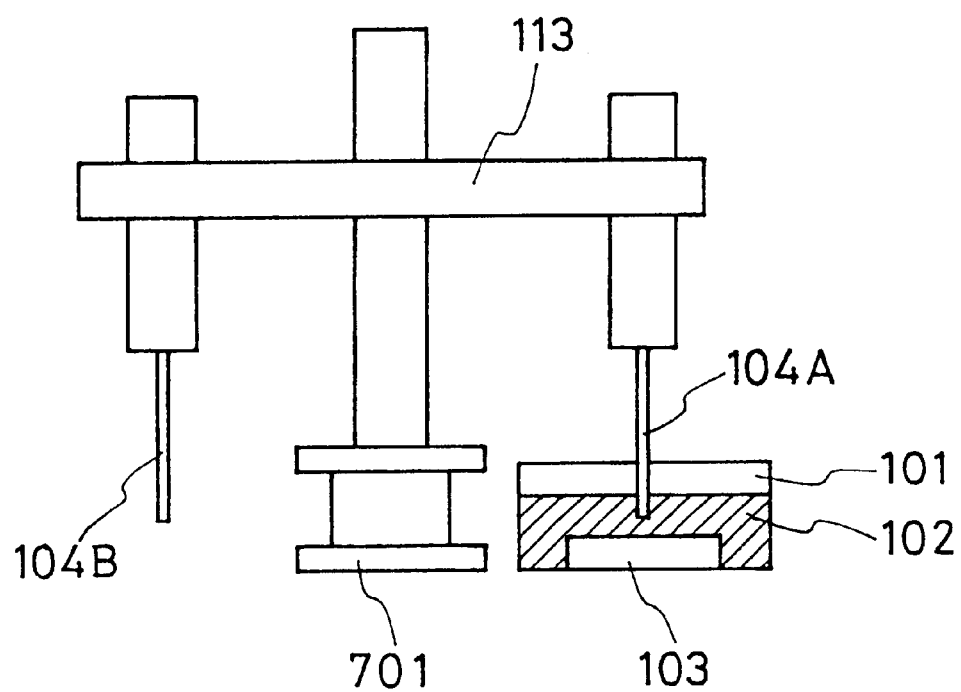
FIG. 9 is an explanatory view showing an example of a machining electrode changing mechanism used in the part fabricating apparatus of FIG. 8.

The machining electrode changing mechanism 701 is structured, for example as shown in FIG. 9, a machining electrode attaching arm 113 attached with machining electrode (A) and machining electrode (B) different in tip diameter and an about-Z-axis rotation mechanism for rotating the machining electrode attaching arm about the Z-axis, so that the machining electrode to be used can be positioned above a surface to be machined of an object to be machined 103 immersed in a machining solution.

This also provided similar effects to Embodiment 1.

In addition, because the resent embodiment can use a plurality of machining electrodes different in tip diameter, it is possible to select a machining electrode suited for a shape of a portion to be machined or kind of machining. The smaller the tip diameter of the machining electrode the higher the machining resolution increases, lowering the machining speed. Accordingly, where no high resolution is required, the use of a machining electrode having a somewhat great tip diameter improves machining efficiency. Accordingly, because the present embodiment makes it possible to selectively use a machining electrode having a tip diameter suited for a machining shape and machining resolution required, machining time could be reduced with high machining accuracy maintained.

The present invention provides the following effects.

(1) Because the cast mold is first fabricated to form a part inside the cast mold and thereafter it is taken out, it is possible to utilize one cast mold many times with increased manufacture efficiency when fabricating, for example, a great volume of parts having same in shape.

(2) Because machining is effected in a non-contact state of the tip of the machining electrode with the surface to be machined of the object to be machined, there is almost no wear of the machining electrode. Accordingly, it is possible to implement machining for a long time without exchanging the machining electrode, readily realizing full automation for part fabrication.

(3) Because in electrolytic machining electrochemical reactions are utilized that occur between the surface to be machined of an object to be machined and the tip of a machining electrode without involvement of physical force, there is no affection of hardness or toughness of an object to be machined. Accordingly, it is possible to machine a material that is difficult to machine by general machine operation.

(4) The increase in machine resolution is facilitated by reducing the tip diameter of the machining electrode, making it easy to cope with miniaturization for parts to be fabricated.

(5) Because part formation is performed by additional machining, the efficiency of material utilization is high making it possible to fabricate such parts having such a shape that is impossible to fabricate only by removal process.

(6) By using a sharp-edged electrode as the machining electrode to machine while moving the machining electrode and an object to be machined along an arbitrary form, it is possible to fabricate complicated three-dimensional shaped parts through less processes with simplification by a same apparatus. Also, there is also no necessity of fabricating a machining electrode having a corresponding tip form to a machining form.

(7) In the electrolytic machining, the utilization of electrochemical reactions will not produce chips even during removal machining. There is no adverse affection of chips on machining accuracy.

(8) The electrochemical reaction utilized for electrolytic machining can be caused by low application voltage, thus being low in energy consumption as compared with electric discharge machining.

(9) The provision of the solution changing means capable of changing the solution easily realizes an automation for part fabrication.

What is claimed is:

1. A part fabricating method comprising the steps of:
   machining an object to fabricate a part cast mold;
   electrolytically depositing a first metal on a surface of the cast mold to form a first metal layer;
   electrolytically depositing a second metal different in kind from the first metal inside the cast mold to form a part; and
   selectively removing the first metal layer to take out the part formed inside the cast mold.

2. A part fabricating method as claimed in claim 1; wherein the machining step comprises placing the object opposite to a machining electrode in an electrolytic solution to cause an electrochemical reaction between a surface of the object and a tip of the machining electrode to thereby electrolytically machine the object.

3. A part fabricating method as claimed in claim 1; wherein the step of electrolytically depositing the first metal comprises causing an electrochemical reaction between a surface of the object and a tip of a machining electrode to deposit the first metal on the surface of the cast mold.

4. A part fabricating method as claimed in claim 1; wherein the step of electrolytically depositing the second metal comprises causing an electrochemical reaction between the first metal layer and a tip of a machining electrode to deposit the second metal inside the cast mold.

5. A part fabricating method as claimed in claim 1; wherein the machining electrode comprises a sharp-edged electrode.

6. A part fabricating method as claimed in claim 1; wherein at least one of the machining step, the step of electrolytically depositing the first metal layer and the step of forming the part includes moving at least one of a machining electrode or the object along an arbitrary shape.

7. A part fabricating method as claimed in claim 1; wherein the step of selectively removing the first metal layer comprises selectively removing the first metal layer by a chemical reaction.

8. A part fabricating method as claimed in claim 1; wherein the step of selectively removing the first metal layer comprises selectively removing the first metal layer by an electrochemical reaction.

9. A part fabricating method comprising the steps of: machining an object to fabricate a part cast mold having a cavity; electrolytically depositing a first metal in the cavity of the cast mold to form a first metal layer; electrolytically depositing a second metal different in kind from the first metal on the first metal to form a part; and selectively removing the first metal layer from the cavity of the cast mold to take out the part from the cavity.

10. A part fabricating method according to claim 9; wherein the step of selectively removing the first metal layer comprises selectively removing the first metal layer by a chemical reaction.

11. A part fabricating method as claimed in claim 9; wherein the step of selectively removing the first metal layer comprises selectively removing the first metal layer by an electrochemical reaction.

12. A part fabricating method as claimed in claim 9; wherein the machining step comprises placing the object opposite to a machining electrode in an electrolytic solution to cause an electrochemical reaction between a surface of the object and a tip of the machining electrode to thereby electrolytically machine the object to form the cavity.

13. A part fabricating method as claimed in claim 9, wherein the step of electrolytically depositing the first metal comprises causing an electrochemical reaction between a surface of the cavity of the object and a tip of a machining electrode to deposit the first metal in the cavity of the cast mold.

14. A part fabricating method as claimed in claim 9; wherein the step of electrolytically depositing the second metal comprises causing an electrochemical reaction between the first metal layer and a tip of a machining electrode to deposit the second metal on the first metal layer inside the cavity of the cast mold.

15. A part fabricating method as claimed in claim 9; wherein the machining electrode comprises a sharp-edged electrode.

16. A part fabricating method as claimed in claim 9; wherein at least one of the machining step, the step of electrolytically depositing the first metal layer and the step of forming the part includes moving at least one of a machining electrode or the object along an arbitrary shape.

17. A part fabricating method according to claim 9; wherein the step of selectively removing the first metal layer comprises selectively dissolving the first metal layer.

18. A part fabricating method according to claim 17; wherein the step of selectively dissolving the first metal layer comprises applying a voltage to selectively dissolve the first metal layer.

* * * * *